Oct. 16, 1923.                                                                 1,470,887
W. SIECK, JR
APPARATUS FOR TREATING LIQUIDS OR SOLIDS WITH GASES
Filed Nov. 7, 1921                              2 Sheets-Sheet 1
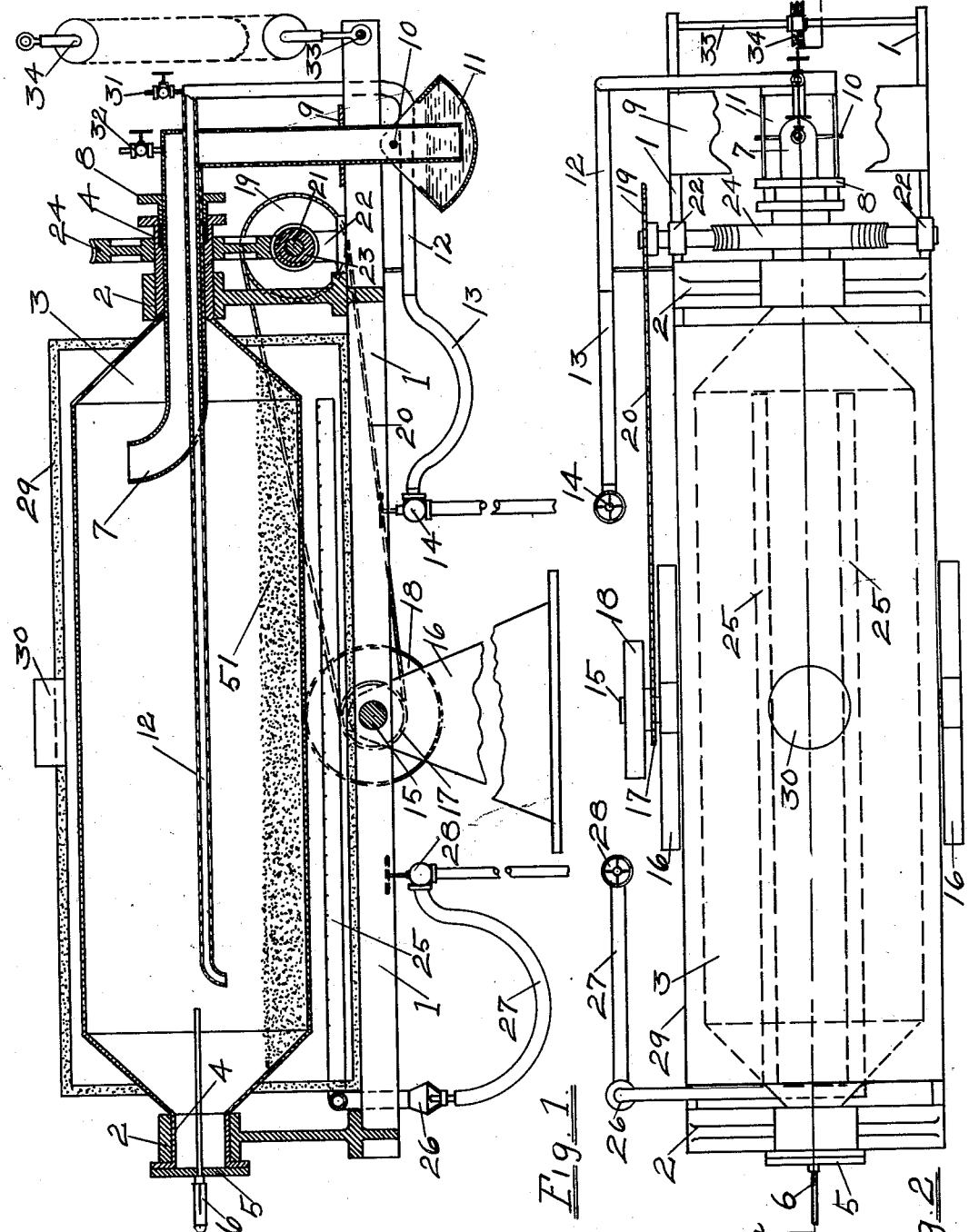
Inventor
William Sieck Jr.
BY J.F.Jochum Jr
Atty.

Oct. 16, 1923.

W. SIECK, JR 1,470,887

APPARATUS FOR TREATING LIQUIDS OR SOLIDS WITH GASES

Filed Nov. 7, 1921

Inventor.
William Sieck Jr.
by J.F. Jochum Jr.
Atty

Patented Oct. 16, 1923.

1,470,887

UNITED STATES PATENT OFFICE.

WILLIAM SIECK, JR., OF CHICAGO, ILLINOIS, ASSIGNOR TO SIECK & DRUCKER, INC., OF CHICAGO, ILLINOIS, A CORPORATION OF ILLINOIS.

APPARATUS FOR TREATING LIQUIDS OR SOLIDS WITH GASES.

Application filed November 7, 1921. Serial No. 513,314.

*To all whom it may concern:*

Be it known that I, WILLIAM SIECK, Jr., a citizen of the United States, residing at Chicago, in the county of Cook and State of Illinois, have invented certain new and useful Improvements in Apparatus for Treating Liquids or Solids with Gases, of which the following is a specification.

In the preparation of certain substances, either solids or liquids it is required that the same be treated with various gases under different conditions of temperature. It is also required in certain instances, that the substance after treatment be protected in some manner from exposure to the air. A common method of bringing about the treatment of liquids or solids with gases, consists of enclosing the substance in a closed cylindrical container revolving with the longitudinal axis in a horizontal position and then introducing a gas into the cylinder. In some cases the contents of the cylinder may be heated by applying heat to the outside of the cylinder. In the case where the substance, after treatment, cannot be exposed to the air the emptying of the cylinder offers particular difficulties. Such is the case in the reduction of nickel salts with hydrogen gas to produce metallic nickel. Nickel so produced is extremely pyrophoric and is easily oxidized by exposure to the air. To provide a means for reducing nickel salts and introducing the finished product into a sealing medium such as oil without exposure to the air is one of the objects of this invention.

In the accompanying drawings:

Figure 1, shows a longitudinal section of the apparatus taken along the line *a—a*, Figure 2 and showing the apparatus in an operative position.

Figure 2 is a top plan view.

Figure 3:
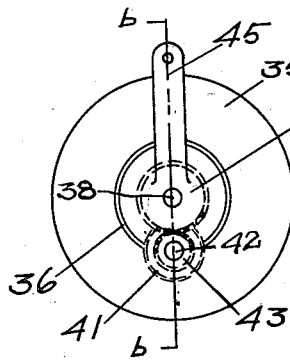
Figure 3 is an end elevation of an unloading device shown in Figure 4.

In the drawings the apparatus is shown as adapted to the reduction of nickel salts for the production of metallic nickel to be used in the hydrogenation of oils but it is to be understood that although the apparatus is particularly adapted for such purpose, it is not necessarily limited to such uses.

The apparatus consists of two suitable frame members 1, which support bearings 2. The cylinder or retort 3 for containing the substance to be treated is provided with hollow journals 4, which revolve in the bearings 2. One of the hollow journals serves as a discharge outlet for the retort or container 3, and also as a filling opening and is closed by a removable cover 5, through which extends a thermometer 6, for ascertaining the temperature inside of the retort.

Through the other hollow journal 4, extends a stationary outlet pipe 7, for the gases generated in the retort or container and the pipe passes through a stuffing box 8, the inner end of the pipe opens into and has communication with the interior of the retort or container 3. The gases in the retort or container are discharged through the outer open end of the pipe preferably into the atmosphere. The outer end of the pipe 7, passes through a plate 9, which is preferably secured to the frame members 1, and constitutes a support for the outlet pipe. The outer end of the outlet pipe 7, is provided with a suitable support preferably in the form of a bar or shaft 10, extending through it and to which is pivotally attached a suitable swinging water seal 11, for sealing the outlet end of the pipe and through which seal the gases are discharged.

A gas inlet pipe 12, passes through the inner portion of the pipe 7 and into the retort 3 and discharges into the retort, and the other end of the pipe 12 is connected by means of a flexible connection 13, to a source of supply of reducing gas. The flow of gas into the retort is preferably controlled by means of a valve 14.

Through the frame members 1, passes a shaft 15, which is supported on suitable bearings 16. Revolving on the shaft 15, is a sprocket 17, which is secured to a driving pulley 18, which latter is also free to revolve on the shaft. Sprocket 17, drives a sprocket 19, through the medium of a chain 20. A shaft 21, is supported by bearings 22, and carries a worm 23, which engages the worm gear 24, which is fixed to the journal 4.

The retort 3 may be heated by means of burners 25, connected to a gas mixer 26, which in turn is connected to a source of heating gas by means of a flexible connection 27. The flow of gas to the burners is controlled by the valve 28.

The retort is enclosed in a heat insulating casing 29, provided with an outlet 30, for the products of combustion. Suitable valves 31 and 32 may be provided for testing the ingoing and outgoing gases. To a cross member 33, is attached a chain hoist 34, or other suitable lifting device by which means the end of the apparatus may be raised or lowered at will, causing the same to swing about the shaft 15 as a pivot.

The charge to be treated is indicated by the numeral 51 in Figure 1. For the purpose of unloading the apparatus, the flange cover 5, is removed and is replaced by an unloading device, shown in Figure 4. The unloading device preferably consists of a flange 35, to which is attached a pipe 36. To the other end of the pipe is attached a bracket 37. A shaft 38, passes through the pipe and also a suitable bearing in the bracket 37, and the portion of the shaft inside of the pipe carries a spiral conveyor 39. To the outer end of the shaft 38, is attached the gear 40, which engages a gear 41, revolving freely on a stud 42. To the gear 41, is fixed a gear 43, which latter engages with a gear 44, free to revolve on the shaft 38. To the gear 44, is fixed an arm 45.

The operation of the apparatus is as follows:

The cover 5, is removed and the open end of the retort is raised by lowering at the chain hoist 34, in order that the material to be treated may be more readily introduced into the retort. The retort is again brought back to a position with its axis horizontal and the cover 5, replaced. The retort is set in motion and the contents are heated by means of the burners 25. The reducing gas enters the retort through the pipe 12, and the products of the reaction and any excess of reducing gas leave the retort through the pipe 7, and the water seal 11. When the reaction has been completed, the burners are shut off and the supply of reducing gas is shut off.

If desired, the gaseous contents of the retort may be swept out by means of an inert gas supplied through the valve 14.

Figure 4:
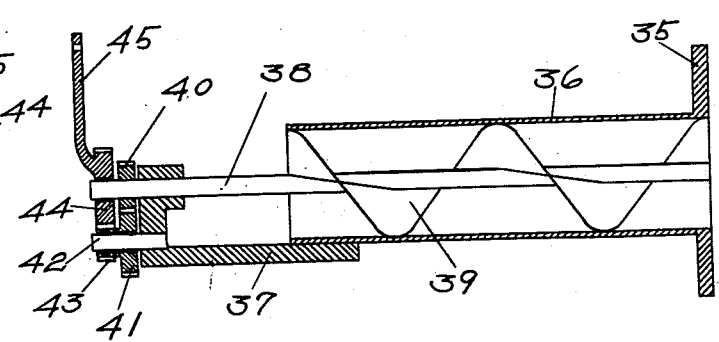
Figure 4 is a longitudinal sectional view taken on line *b—b*, Figure 3.
Figure 5:
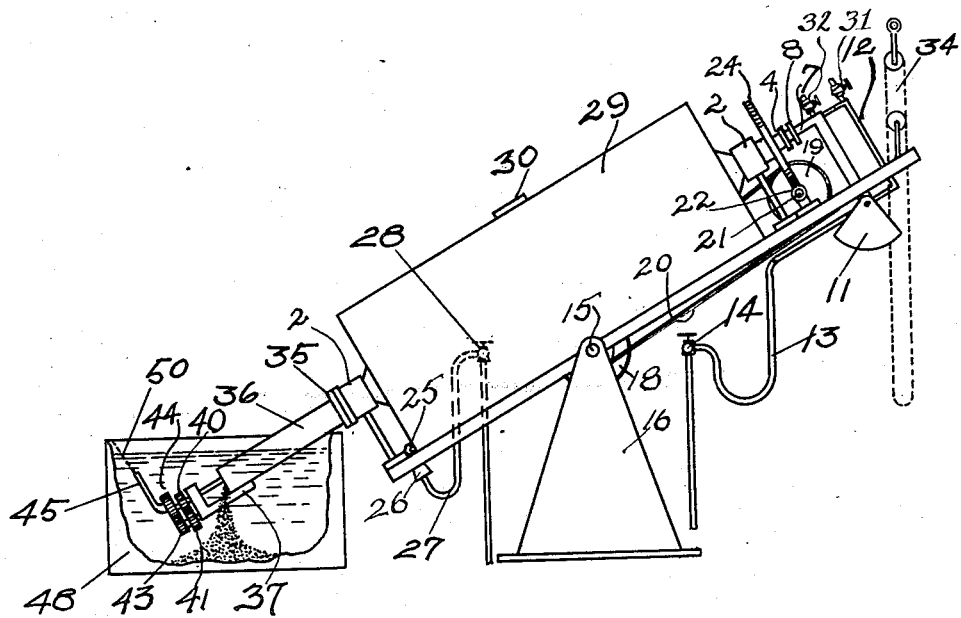
Figure 5 is an elevation of the apparatus with the unloading device applied thereto and showing the apparatus in an unloading or emptying position.

The cover 5, is replaced by the unloading device shown in Figure 4, and the apparatus is tilted until the open end of the unloading device is submerged in a suitable sealing medium contained in a tank 48. The end of the arm 45, is secured to the tank 48, by means of a chain 50, and the retort again set in motion.

Through the action of the train of gears 40, 41, 43, and 44, motion is imparted to the spiral conveyor. The material inside of the retort flows towards the lower end and is carried by the conveyor screw into, and thoroughly mixed with, the sealing medium contained in the tank without exposure to the air. The swinging water seal 11, prevents the entrance of air into the retort through the pipe 7.

What is claimed as new is:—

1. An apparatus for treating liquids or solids with gases, embodying a cylindrical container, the normal position of the axis thereof being substantially horizontal, means for revolving the container, means mounting the container for inclination in one direction while the same is revolving, for the purpose of introducing a charge to be treated, and for inclination in another direction while revolving, for the purpose of discharging said charge, means for introducing a gas into the container from one end thereof, means for removing the products of reaction from the opposite end of the container, means closing the discharge outlet of the container at all positions of inclination of the axis, and mechanical means for removing the contents of the container and mixing the same with a sealing medium without exposing the contents of the container to the air.

2. An apparatus for treating liquids or solids with gases, embodying a cylindrical container, the normal position of the axis thereof being substantially horizontal, means for revolving the container, means mounting the container for inclination in one direction while the same is revolving, for the purpose of introducing a charge to be treated, and for inclination in another direction while revolving, for the purpose of discharging said charge, means for introducing a gas into the container from one end thereof, means for removing the products of reaction from the opposite end of the container, means closing the discharge outlet of the container at all positions of inclination of the axis, and means for removing the contents of the container and mixing the same with a sealing medium without exposing the contents of the container to the air, the last recited means being interchangeable with the said closing means.

3. An apparatus for treating liquids or solids with gases, embodying a cylindrical container, the normal position of the axis thereof being substantially horizontal, means for revolving the container, means mounting the container for inclination in one direction while the same is revolving, for the purpose of introducing a charge to be treated, and for inclination in another direction while revolving, for the purpose of discharging said charge, means for introducing a gas into the container from one end thereof, means for removing the products of reaction from the opposite end of the container, means closing the discharge outlet of the container at all positions of inclination of the axis, means exterior of the container for heating the same, and mechanical means for removing the contents of the container and mixing the same with a sealing midium without exposing the contents of the container to the air.

4. An apparatus for treating liquids or solids with gases, embodying a cylindrical container, means for revolving the container, means mounting the container for inclination in different directions, said container having a discharge outlet, a closure for the outlet, means for introducing a gas into the container, means interchangeable with the said closure for removing the products of reaction from the container, and means for inclining the container.

5. An apparatus for treating liquids or solids with gases, embodying a cylindrical container, means for revolving the container, means mounting the container for inclination in different directions, said container having a discharge outlet, a closure for the outlet, means for introducing a gas into the container, means interchangeable with the said closure for removing the products of reaction from the container, means for inclining the container, a gas discharge outlet pipe leading from the container, and a swinging liquid seal for the end of the pipe.

6. An apparatus for treating liquids or solids with gases, embodying a cylindrical container, means for revolving the container, means mounting the container for inclination in different directions, said container having a discharge outlet, a closure for the outlet, means for introducing a gas into the container, means interchangeable with the said closure for removing the products of reaction from the container, means for inclining the container, a gas discharge outlet pipe leading from the container, a swinging liquid seal for the end of the pipe, and a test valve device connected with the pipe.

7. An apparatus for treating liquids or solids with gases, embodying a closed container, means for revolving the container, means mounting the container for inclination in different directions, said container having a discharge outlet, means for introducing a gas into the container, means for heating the container, mechanical delivery means operating adjacent the said outlet for delivering the treated material from the container, in combination with means forming a liquid seal for the outlet end of the said delivery means and with which sealing means the contents of the container are mixed without exposing the said contents to the air.

8. An apparatus for treating liquids or solids with gases, embodying a closed container, means for revolving the container, means mounting the container for inclination in different directions, said container having a discharge outlet, means for introducing a gas into the container, means for heating the container, mechanical delivery means operating adjacent the said outlet for delivering the treated material from the container, an outlet pipe leading from the container for gases generated in the container, and a liquid seal for the discharge end of the said outlet pipe in combination with means forming a liquid seal for the outlet end of the said delivery means and with which last recited sealing means the contents of the container are mixed without exposing the said contents to the air.

9. An apparatus for treating liquids or solids with gases, embodying a closed container, means for revolving the container, means mounting the container for inclination in different directions, said container having a discharge outlet, means for introducing a gas into the container, means for heating the container, delivery means operating adjacent the said outlet for delivering the treated material from the container, in combination with means forming a liquid seal for the outlet end of the said delivery means and with which sealing means the contents of the container are mixed without exposing the said contents to the air, the said delivery means embodying means operatively connected with the container for actuating the former.

10. An apparatus for treating liquids or solids with gases, embodying a closed container, means for revolving the container, means mounting the container for inclination in different directions, said container having a discharge outlet, means for introducing a gas into the container, means for heating the container, mechanical delivery means operating adjacent the said outlet for delivering the treated material from the container, in combination with means forming a liquid seal for the outlet end of the said delivery means and with which sealing means the contents of the container are mixed without exposing the said contents to the air, the said delivery means being responsive in its operation to the rotation of the container.

11. An apparatus for treating liquids or solids with gases, embodying a closed container, means for revolving the container, means mounting the container for inclination in different directions, said container having a discharge outlet, means for introducing a gas into the container, means for heating the container, delivery means operating adjacent the said outlet for delivering the treated material from the container, in combination with means forming a liquid seal for the outlet end of the said delivery means and with which sealing means the contents of the container are mixed without exposing the said contents to the air, the said delivery means embodying a plurality of gears responsive in their operation to the rotation of the container, and means for maintaining one of the gears against rotation.

12. An apparatus for treating liquids or solids with gases, embodying a closed container, means for revolving the container, means mounting the container for inclination in different directions, said container having a discharge outlet, means for introducing a gas into the container, means for heating the container, means constituting a gas escape from the container, delivery means co-operating with the discharge outlet for delivering the material from the container in combination with means forming a liquid seal for the discharge end of the said delivery means and with which sealing medium the contents of the container are mixed without being exposed to the air, and a closure for the said discharge outlet of the container, said closure and delivery means being interchangeable.

13. An apparatus of the character described embodying a container mounted for inclination in different directions and having a discharge outlet, means for rotating the container, a tubular casing connected with the container and registering with the said outlet, a conveyor in the casing, intermeshing gears connected with the said casing and conveyor, and means for maintaining one of the said gears against rotation, whereby the rotation of the casing with the said container will actuate the conveyor in the casing.

14. An apparatus of the character described embodying a container having a discharge outlet, means for rotating the container, a tubular casing connected with the container and registering with the said outlet, a conveyor in the casing, intermeshing gears connected with the said casing and conveyor, means for maintaining one of the said gears against rotation, whereby the rotation of the casing with the said container will actuate the conveyor in the casing, means mounting the container for inclination in different directions, in combination with means forming a liquid seal for the open end of the said casing when the said container is in a predetermined position and with which sealing medium the contents of the container are mixed without exposing them to the air.

In testimony whereof I have signed my name to this specification, on this 3rd day of November, A. D. 1921.

WILLIAM SIECK, Jr.